US008965285B2

(12) United States Patent
Palin et al.

(10) Patent No.: US 8,965,285 B2
(45) Date of Patent: *Feb. 24, 2015

(54) TOUCH INQUIRY

(75) Inventors: Arto Palin, Viiala (FI); Jukka Reunamäki, Tampere (FI)

(73) Assignee: Nokia Corporation, Espoo, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/107,145

(22) Filed: May 13, 2011

(65) Prior Publication Data
US 2012/0289157 A1 Nov. 15, 2012

(51) Int. Cl.
H04B 5/00 (2006.01)
H04B 7/00 (2006.01)
H04B 17/02 (2006.01)
H04W 8/24 (2009.01)
H04W 76/02 (2009.01)
H04W 4/00 (2009.01)

(52) U.S. Cl.
CPC .............. *H04W 8/24* (2013.01); *H04W 76/023* (2013.01); *H04W 4/008* (2013.01)
USPC .......... 455/41.2; 455/134; 455/161.3

(58) Field of Classification Search
USPC ............ 455/41.1–41.3, 451, 552.1, 509, 557, 455/134, 161.3; 386/297; 375/130; 370/330
See application file for complete search history.

(56) References Cited

U.S. PATENT DOCUMENTS

| 5,530,702 | A | 6/1996 | Palmer et al. |
| 6,816,063 | B2 | 11/2004 | Kubler et al. |
| 6,892,052 | B2 | 5/2005 | Kotola et al. |
| 7,075,412 | B1 | 7/2006 | Reynolds et al. |
| 7,151,764 | B1 | 12/2006 | Heinonen et al. |
| 7,519,682 | B2 | 4/2009 | Smith et al. |

(Continued)

FOREIGN PATENT DOCUMENTS

| DE | 102010019328 | 12/2010 |
| EP | 2073514 | 6/2009 |

(Continued)

OTHER PUBLICATIONS

Bluetooth Extended Inquiry Response (Nokia 2010).*

(Continued)

*Primary Examiner* — Andrew Wendell
*Assistant Examiner* — Cindy Trandai
(74) *Attorney, Agent, or Firm* — Locke Lord LLP

(57) ABSTRACT

A system for expediting wireless connection establishment between wireless-enabled apparatuses. In at least one example implementation an apparatus may transmit discovery messages for discovering other apparatuses. The apparatus may receive one or more messages responding to the discovery message, and may determine whether any of the received responses satisfy a predetermined response criteria. If the apparatus determines that any of the received messages satisfy the response criteria, wireless connection establishment may be expedited between the apparatus and a source apparatus for each of the received messages that satisfy the response criteria. In an alternative scenario where a touch mode may be active in an apparatus that receives a message from at least one other apparatus, the apparatus may determine whether the message satisfies a predetermined criteria. If the message is determined to satisfy the criteria, the apparatus may expedite wireless connection establishment to the other apparatus.

25 Claims, 11 Drawing Sheets

(56) References Cited

U.S. PATENT DOCUMENTS

| | | | |
|---|---|---|---|
| 7,775,432 | B2 | 8/2010 | Jalkanen et al. |
| 8,210,433 | B2 | 7/2012 | Jalkanen et al. |
| 2001/0045460 | A1 | 11/2001 | Reynolds et al. |
| 2002/0021809 | A1 | 2/2002 | Salo et al. |
| 2002/0022961 | A1 | 2/2002 | Sepanaho |
| 2002/0023264 | A1 | 2/2002 | Aaltonen et al. |
| 2002/0069406 | A1 | 6/2002 | Aaltonen et al. |
| 2002/0071436 | A1 | 6/2002 | Border et al. |
| 2002/0087997 | A1 | 7/2002 | Dahlstrom |
| 2002/0191998 | A1 | 12/2002 | Cremon et al. |
| 2003/0043041 | A1 | 3/2003 | Zeps et al. |
| 2003/0084177 | A1 | 5/2003 | Mulligan |
| 2003/0097304 | A1 | 5/2003 | Hunt |
| 2003/0120745 | A1 | 6/2003 | Katagishi et al. |
| 2003/0134653 | A1 | 7/2003 | Sarkkinen et al. |
| 2003/0220765 | A1* | 11/2003 | Overy et al. .................. 702/158 |
| 2004/0081117 | A1* | 4/2004 | Malek et al. .................. 370/324 |
| 2004/0193676 | A1 | 9/2004 | Marks |
| 2004/0203413 | A1 | 10/2004 | Harumoto |
| 2004/0225199 | A1 | 11/2004 | Evanyk et al. |
| 2005/0054290 | A1 | 3/2005 | Logan et al. |
| 2005/0073522 | A1* | 4/2005 | Aholainen et al. ............ 345/440 |
| 2007/0047505 | A1 | 3/2007 | Wassingbo |
| 2007/0141984 | A1* | 6/2007 | Kuehnel et al. .............. 455/41.2 |
| 2007/0275746 | A1* | 11/2007 | Bitran ........................... 455/509 |
| 2007/0291710 | A1 | 12/2007 | Fadell |
| 2008/0004021 | A1 | 1/2008 | Sanjay |
| 2008/0055632 | A1 | 3/2008 | Oshiumi et al. |
| 2008/0090606 | A1* | 4/2008 | Hwang et al. ............... 455/553.1 |
| 2008/0146151 | A1 | 6/2008 | Lyu et al. |
| 2008/0242220 | A1 | 10/2008 | Wilson et al. |
| 2008/0311957 | A1* | 12/2008 | Jantunen et al. .............. 455/560 |
| 2009/0161582 | A1* | 6/2009 | Kammer et al. .............. 370/254 |
| 2009/0163198 | A1* | 6/2009 | Ray et al. ...................... 455/425 |
| 2009/0180519 | A1 | 7/2009 | Lee et al. |
| 2009/0215397 | A1* | 8/2009 | Thorn et al. .................. 455/41.2 |
| 2009/0276439 | A1 | 11/2009 | Rosenblatt et al. |
| 2010/0082784 | A1 | 4/2010 | Rosenblatt et al. |
| 2010/0093280 | A1 | 4/2010 | Ahn et al. |
| 2010/0105328 | A1 | 4/2010 | Ahn et al. |
| 2010/0120364 | A1* | 5/2010 | Lee et al. ...................... 455/41.2 |
| 2010/0144274 | A1* | 6/2010 | Mcdowall et al. ........... 455/41.2 |
| 2010/0211698 | A1 | 8/2010 | Krishnaswamy |
| 2010/0241529 | A1 | 9/2010 | Kim |
| 2010/0250135 | A1 | 9/2010 | Li et al. |
| 2010/0268828 | A1* | 10/2010 | Pahlavan et al. .............. 709/227 |
| 2010/0319055 | A1* | 12/2010 | Tamura et al. ..................... 726/4 |
| 2011/0140864 | A1* | 6/2011 | Bucci ......................... 340/10.42 |
| 2011/0235624 | A1* | 9/2011 | Scott et al. .................... 370/338 |
| 2012/0015605 | A1* | 1/2012 | Sole .............................. 455/41.3 |
| 2012/0017257 | A1* | 1/2012 | Lee et al. ...................... 725/153 |
| 2012/0081235 | A1* | 4/2012 | Nadeem et al. ............... 340/933 |
| 2012/0169473 | A1 | 7/2012 | Jalkanen et al. |

FOREIGN PATENT DOCUMENTS

| | | |
|---|---|---|
| EP | 2355563 | 8/2011 |
| EP | 2424281 | 2/2012 |
| WO | WO0051293 | 8/2000 |
| WO | 0067221 | 11/2000 |
| WO | WO 0145319 | 6/2001 |
| WO | WO 0152179 | 7/2001 |
| WO | WO 0211074 | 2/2002 |
| WO | WO2007040398 | 4/2007 |
| WO | WO2009013646 | 1/2009 |

OTHER PUBLICATIONS

European Search Report for EP Application No. 08006467.8-2412 / 1965555 dated Nov. 2, 2011.
Office Action for Korean Application No. 10-2006-7009441 dated Apr. 23, 2007.
Notice of Allowance for Korean Application No. 10-2006-7009441 dated Jan. 7, 2008.
Communication with European Search Report of European Patent Application No. 12166717.4-2412—Date of Completion of Search: Jul. 12, 2012, 10 pages.
International Search Report for International Application No. PCT/FI2012/050431—Date of Completion of Search: Sep. 3, 2012—4 pages.
Written Opinion of the International Searching Authority for International Application No. PCT/FI2012/050431—Date of Completion of Opinion: Sep. 3, 2012—6 pages.
Widmer, Peter, "Smart Box Software Framework" Vision Document, Apr. 7, 2003, 23pp.
Notice and Filing of Opposition in European Patent 1 685 689, Apr. 24, 2009, 11 pages.
Reply to Notice of Opposition in European Patent 1 685 689, Sep. 28, 2009, 11 pages.
English Language Machine Translation of German Patent Application Publication No. DE 10 2010 019 328—16 pages.
Substantive Examination Adverse Report with Search Report for Malaysian Patent Application No. PI2012002048, Sep. 15, 2014, 4 pages.
Radio Frequency Identification RFID—A basic primer; AIM Inc. White Paper; Aug. 23, 2001; 17 pages; 1.2; The association of the Automatic Identification and Data Capture Industry (AIM Inc.); WP-98002R2.
Notice and Filing of Opposition in European Patent 1 685 689, Apr. 24, 2009.
Reply to Notice of Opposition in European Patent 1 685 689, Sep. 28, 2009.
International Search Report for International Application No. PCT/FI2012/050442—Date of Completion of Search: Sep. 18, 2012—4 pages.
Written Opinion of the International Searching Authority for International Application No. PCT/FI2012/050442—Date of Completion of Opinion: Sep. 18, 2012—7 pages.

* cited by examiner

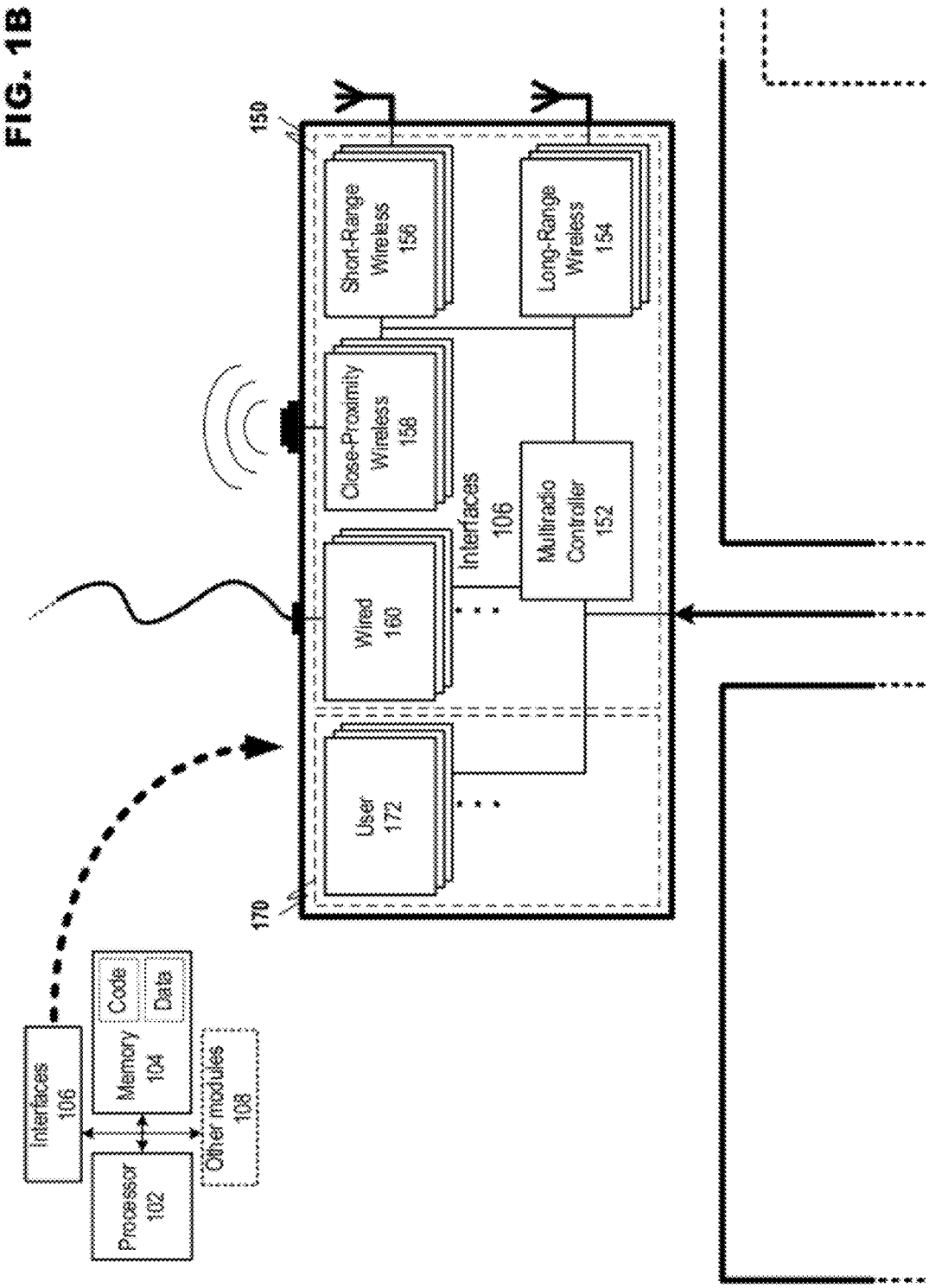

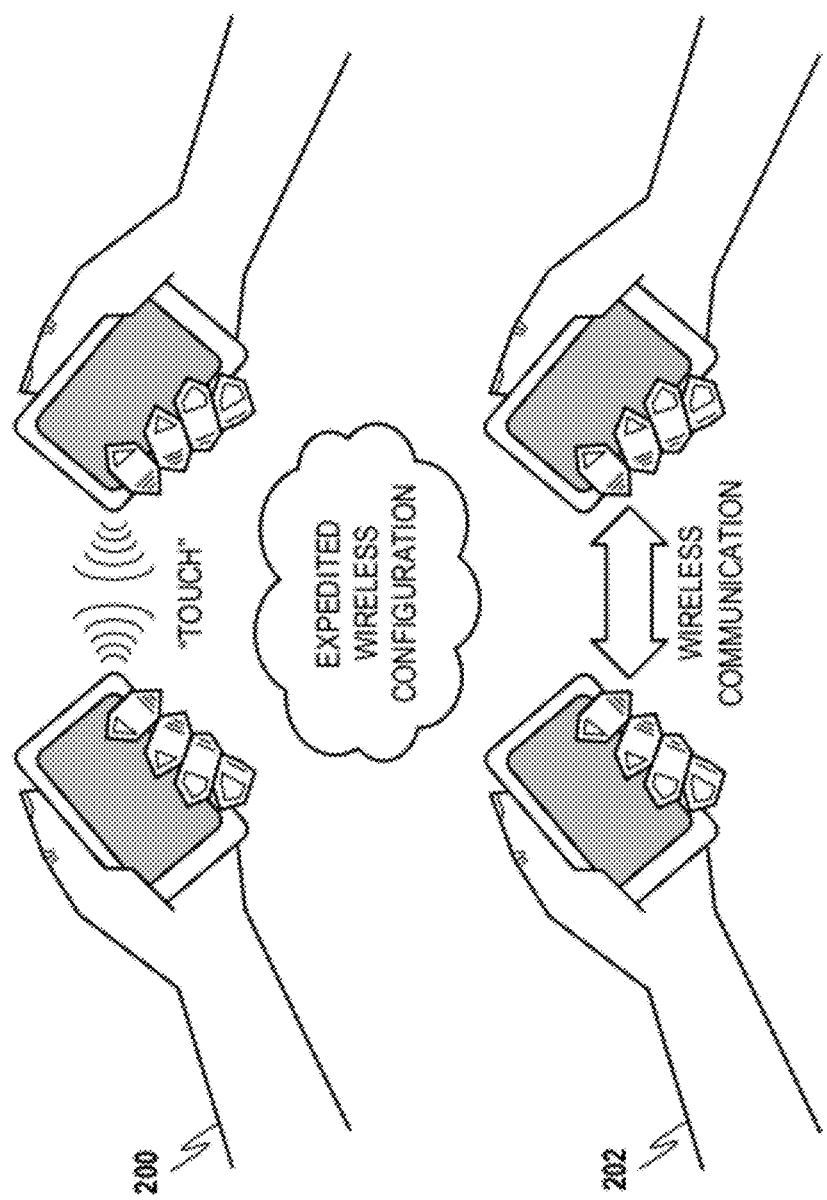

TOUCH INQUIRY

BACKGROUND

1. Field of Invention

The present invention relates to wireless communication, and in particular, to facilitating wireless connection establishment between closely situated apparatuses.

2. Background

The ability of apparatuses to communicate wirelessly has progressed beyond the simple conveyance of voice information to encompass a multitude of electronic data types. For example, emerging wireless-enabled apparatuses may exchange textual data (e.g., text messages, emails, etc.), machine-readable data files, multimedia files, directional data, Internet-related data such as a webpage, etc. Electronic data may be conveyed over various wireless mediums, such as via long-range cellular architectures like Code Divisional Multiple Access (CDMA), Global System for Mobile communications (GSM), etc., via short-range wireless networking engaged over Bluetooth, wireless local area networking (WLAN), etc., or via direct device-to-device interactions over very short distances such as in instances of Near Field Communication (NFC).

The forms of communication available to wireless-enabled apparatuses may each have benefits making them appropriate for certain situations. For example, short-range wireless communications may operate in unregulated bandwidth between two or more apparatuses either directly or through a local master apparatus. Communication conducted via such mediums (e.g., Bluetooth, WLAN, etc.) may have benefits in that localized data transfers may occur relatively quickly with the ability to ensure data integrity and security during the transfer. For example, short-range wireless communication may allow for wireless-enabled peripherals (e.g., keyboards, headsets, etc.) to be employed with mobile wireless communication apparatuses for enhancing user experience. Such activity may occur alone or along with data (e.g., business cards, pictures, videos, sound files, etc.) being exchanged amongst these apparatuses without the need for support from long-range wireless networks that may be unavailable in some areas (e.g., indoors).

However, in addition to the above benefits, short-range wireless communications may also entail some configuration burden. As opposed to long-range wireless communications that may utilize a fixed configuration profile that may be recognized by any cell in the network, short-range wireless communications may need to be configured on a network-to-network basis. Therefore, users of apparatuses engaging in short-range wireless communication must have some knowledge of the configuration procedure in order to establish a short-range wireless connection, and even if the user has the requisite knowledge, the time and/or effort expended by the user in setting up the wireless connection may impact negatively on the overall experience of the user.

SUMMARY

Various example embodiments of the present invention may be directed to a method, apparatus, computer program product and system for expediting wireless connection establishment between wireless-enabled apparatuses. In at least one example implementation an apparatus may transmit discovery messages for discovering other apparatuses. The apparatus may receive one or more messages responding to the discovery message, and may determine whether any of the received responses satisfy a predetermined response criteria. If the apparatus determines that any of the received messages satisfy the response criteria, wireless connection establishment may be expedited between the apparatus and a source apparatus for each of the received messages that satisfy the response criteria. In an alternative scenario where a touch mode may be active in an apparatus that receives a message from at least one other apparatus, the apparatus may determine whether the message satisfies a predetermined criteria. If the message is determined to satisfy the criteria, the apparatus may expedite wireless connection establishment to the other apparatus.

In the first example where messages inviting a wireless connection are transmitted from an apparatus, the predetermined response criteria may comprise the one or more response messages including certain types of messages with at least one of the certain types of messages being determined to have a measured signal strength at or above a predetermined signal strength level. In an example scenario using Bluetooth wireless communication, the discovery messages may be identity (ID) packets and the one or more response messages may comprise at least one frequency hopping synchronization (FHS) packets and extended inquiry response (EIR) packets. A predetermined response criteria in terms of Bluetooth may then be the one or more response messages comprising FHS and EIR packets, wherein the FHS packets have a received signal strength indication (RSSI) at or above a predetermined signal strength level. Expediting wireless connection establishment may then comprise the apparatus displaying an indication that a connection will automatically be established between the apparatus and the source apparatus for each of the one or more response messages satisfying the predetermined response criteria, followed by the establishment of the previously indicated wireless connections.

In instances where a touch mode is activated in the apparatus that then receives a message from at least one other apparatus, the predetermined criteria may comprise the message having a measured signal strength at or above a predetermined signal strength level. In example scenarios where Bluetooth wireless communication is being employed, the message received by the apparatus from the at least one other apparatus may be a identity (ID) packet.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 1B discloses further detail regarding an example apparatus configuration that may be utilized when implementing the various embodiments of the present invention.

FIG. 2 discloses an example touch activity in accordance with at least one embodiments of the present invention.

DESCRIPTION OF EXAMPLE EMBODIMENTS

Figure 1A:
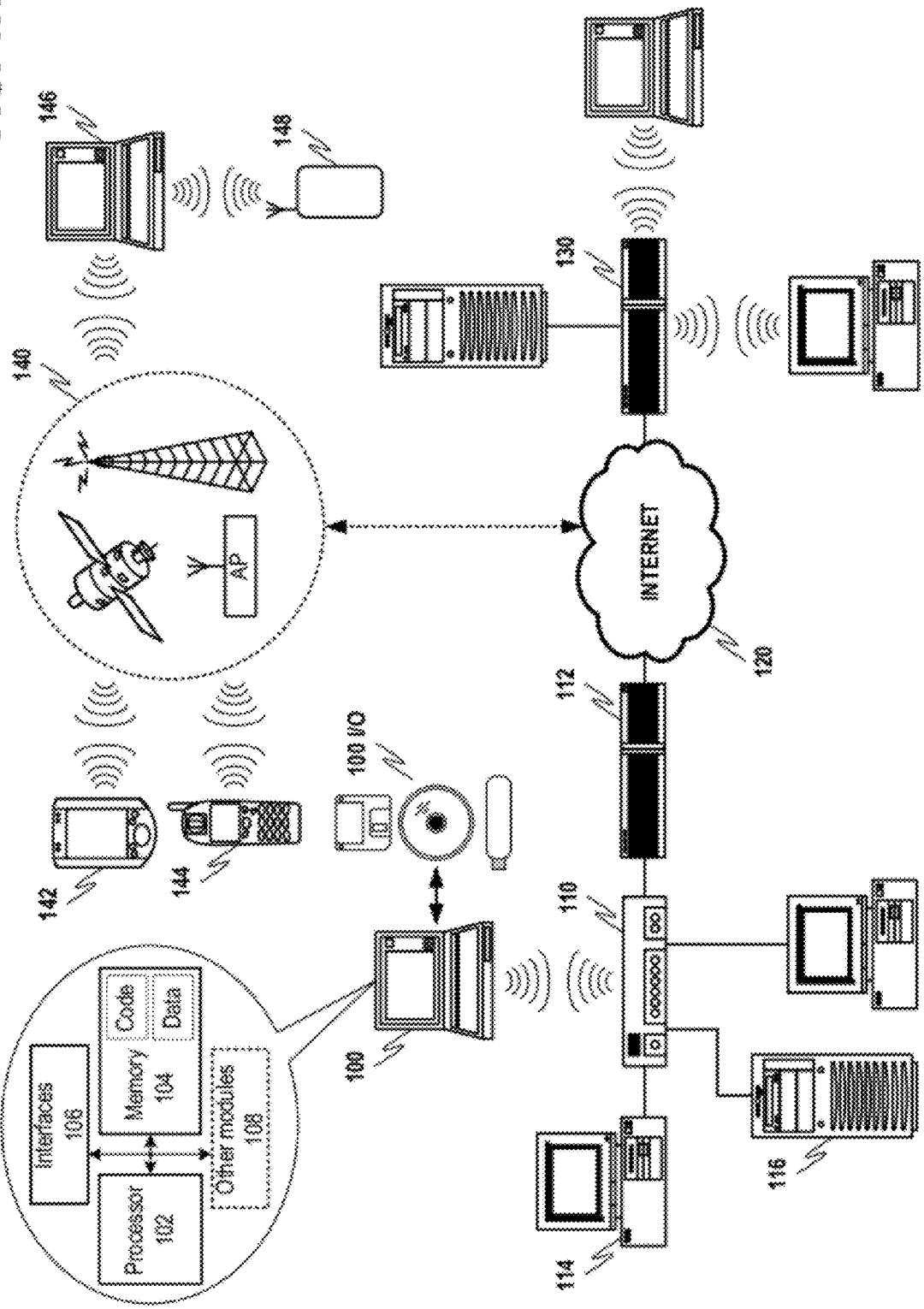
FIG. 1A discloses example apparatuses, systems, configurations, etc. that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or fixed imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1A, and may serve, for instance, as a data input/output means for computing device 100. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Apparatus Interaction

The conveyance of electronic information is no longer bound by the requirement of being first encoded on physical media for transfer. For example, data may go from creation to distribution to consumption by an end user without ever touching a game cartridge, compact disk (CD), digital video disk (DVD), etc. The removal of the physical medium as an intermediary has influenced the evolution of emerging electronic apparatuses in that traditional resources used for accessing (e.g., reading from and/or writing to) physical media are disappearing. This evolution has placed a new focus on the efficiency and ease-of use for device-to-device communication.

While wired communication may still provide for the reliable conveyance of data between stationary devices, mobile apparatus users demand flexibility without the encumbrances of cables, physical media, etc. While long-range wireless communication mediums may be able to route information between apparatuses, communication does not occur directly between the apparatuses (e.g., it is routed through the cellular base station architecture), which may result in costs to a user for access to a provider's licensed bandwidth, delays caused by indirect routing and traffic on the provider's network, and possible inaccessibility due to long-range wireless data networks not always being available (e.g., indoors). Alternatively, short-range wireless networks may be deemed a better solution in that they provide relatively quick and secure device-to-device communication.

However, short-range wireless communication may require initial configuration. This configuration may involve a user manipulating various menus in an apparatus in order to trigger communication modes that allow apparatuses participating in the wireless interaction to obtain communication configuration information needed for accessing the other apparatuses. For example, apparatuses communicating via Bluetooth may initially go through a "discovery" and then "pairing" processes during which participating apparatuses obtain apparatus identification, security, channel hopping, etc. information that is usable when accessing other apparatuses. These configuration activities take time and skill to complete, which may run contrary to growing user expectation for more immediate and automatic communication operations when utilizing their mobile apparatuses.

III. Example Apparatus Interaction

In accordance with at least one embodiment of the present invention, an example wireless interaction is disclosed in FIG. 2 that, from the viewpoint of a user, may be desirable in that it may greatly simplify information exchanges. In the example shown in FIG. 2, two users may desire to wirelessly exchange electronic data between their mobile apparatuses. In step 200 the users may "touch" their apparatuses together, which may trigger some configuration to occur, and thus result in short-range wireless communication being established between the apparatuses in step 202. Touching, at least for the purposes of the current disclosure, does not require that the apparatuses actually come into physical contact with each other. Holding the apparatuses in close proximity for a short duration of time may be enough to trigger operations, after which the apparatuses may be separated and utilized within the communication range of whatever wireless communication medium is being utilized in order to support apparatus interaction. Such wireless interaction may be implemented utilizing various types of short-range wireless communication. While a multitude of wireless communication mediums are available, the various embodiments of the present invention disclosed herein use Bluetooth for the sake of explanation. The use of Bluetooth in the following disclosure is intended only as an example, and thus, other short-range wireless communication mediums may be employed in implementing the various embodiments.

Bluetooth is an example of a short-range communications technology that was originally intended to replace the cable(s) connecting portable and/or fixed electronic devices, but has grown to facilitate more general wireless communication between various apparatuses. Some of the key features of Bluetooth are robustness, low power consumption and low cost. Many of the features set forth in the Bluetooth core specification are optional, allowing for product differentiation. Existing Bluetooth interaction is based an inquiry method for device discovery, wherein an apparatus inquires about other apparatuses within transmission range and other devices interested in interacting with the inquiring apparatus respond to the inquiry. More specifically, an apparatus performing an inquiry scan is discoverable in that it may respond to inquiry packets that were transmitted from other devices in the inquiry state (e.g., trying to find discoverable devices). The inquiring device and any responding devices may then proceed to form a wireless network (e.g., a Bluetooth piconet) via which apparatus interaction is conducted.

Figure 3:
FIG. 3 discloses an example user interface display indication in accordance with at least one embodiment of the present invention.

During the inquiry process, when lower-level communication control resources in the inquiring apparatus receive a response from another apparatus, such as a frequency hopping synchronization (FHS) packet, the "found" apparatuses are typically reported to the host (e.g., upper-level processing resources in the inquiring apparatus). Even though multiple response messages may be received from each responding apparatus, it is recommended that the controller report each apparatus to the host only once. An example user interface (UI) operation for this process is disclosed in FIG. 3. In UI 300 the inquiry process has just started and two devices have responded. In UI 300 the inquiry process is complete and all responding apparatuses are displayed in the list, wherein each apparatus responding to the inquiry is listed only once.

In accordance with the various embodiments of the present invention, a usability problem may exist that may impede implementation of the touch system in that all apparatuses within range of the inquiring apparatus may respond to an inquiry. Given existing operations, the user of the inquiring apparatus would then have to recognize which responding apparatus is intended for the touch operation by recognizing its name as listed, for example, in UI 302. Identification may not be straightforward for the user due to, for instance, two or more responding apparatuses having the same default name (e.g., a name given to the device by the manufacturer that was not changed by the user), or the user of the inquiring apparatus not owning the target apparatus (e.g., as in the example of FIG. 2 where the second apparatus in the touch operation is owned by another user). The inquiring apparatus user would then be forced to ask the user of the second apparatus for the name of the target apparatus, which may not be known to many users.

In an existing solution to this problem the inquiring apparatus may measure the signal strength (e.g., Received Signal Strength Indication or RSSI) of each response message, which may be used in ordering the responding devices in UI 302 so that the apparatus with the highest measured signal strength is listed first (e.g., wherein the measured signal strength may correlate to the distance between the inquiring apparatus and the responding devices). However, this solution does not provide reliable results in that the measurement is limited to the first time the response message was received (e.g., since only one response is reported for each apparatus), and thus, the listing in UI 302 may be inaccurate for moving apparatuses such as shown in the touch example of FIG. 2. Further it may happen that, due to the irregularities in the wireless communication medium, the signal strengths of a single transmission might provide false results. Another possible solution may be to implement another form of wireless interaction having a substantially shorter transmission range such as radio frequency (RF) or infrared (IR), wherein communication over the secondary shorter wireless medium may serve as an indicator that the apparatuses are within touch range. However, an obvious barrier to implementing this approach is that hardware/software resources must be implemented to support a second form of wireless interaction that consumes space, power and processing, which are limited in mobile apparatuses.

IV. Example Touch Implementation

The various embodiments of the present invention do not suffer from the above deficiencies, and thus, may be able to implement continuous sensing for a device-to-device touch operations all within a single wireless communication medium. Touch operations, in at least one example implementation, may sense when apparatuses are being held or moved closer together and may trigger automated wireless connection establishment between only apparatuses that are within close proximity of each other. In particular, features that are available in the Bluetooth Specification 4.0 in regard to extended inquiry response (EIR) may be leveraged, wherein EIR responses shall be reported to the host multiple times during an inquiry scan. These features may also be enabled for apparatuses not configured to transmit EIR packets by requesting that these apparatuses are reported to a host more than once, which is allowed by the specification but not typically implemented.

Figure 4:
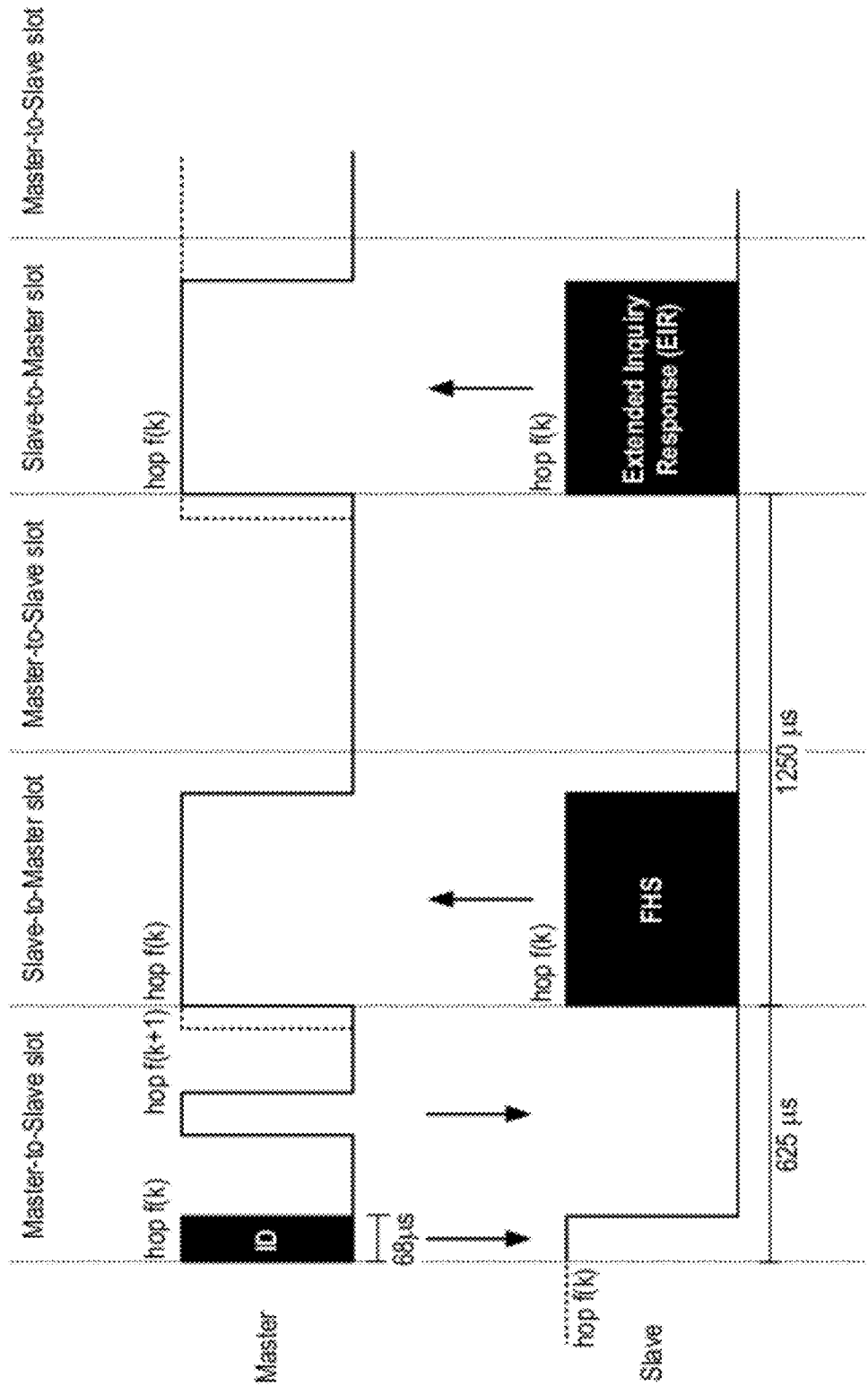
FIG. 4 discloses an example of wireless connection establishment in accordance with at least one embodiment of the present invention.

In the example of Bluetooth, inquiring apparatuses transmit ID packets that may be scanned by discoverable apparatuses. Discoverable apparatuses may then respond to the ID packets by transmitting an FHS packet. Discoverable apparatuses may further transmit an EIR packet after the FHS packet to deliver additional information including, for example, apparatus name, transmission (Tx) power, etc. An example wireless interaction is disclosed in FIG. 4. The default duration of a Bluetooth inquiry scan is 11.25 ms when performing a standard scan and 22.5 ms when performing an interlaced scan. The default value for an inquiry scan interval is 2.56 s. In the example of FIG. 4, the master-to-slave slot time may be 625 µs, and the total master-to-slave and slave-to-master slot time may be 1250 µs. An inquiry may be performed in order to find discoverable devices within transmission range. Apparatuses in a discoverable mode that receive inquiry packets (e.g., ID packets, typically having a duration of 68 µs) may transmit a response including a FHS packet. The FHS packet may comprise at least Bluetooth address, device class, whether an extended inquiry response follows, page scan mode and clock phase. Clock offset and address information may be utilized by inquiring devices to estimate channel information, hop(k), so that communication may be continued on future channels, hop f(k+1), in accordance with a frequency hop pattern. Estimating hop pattern information may allow the inquiring apparatus to follow the hops of the responding apparatus in order to establish a network connection with the responding apparatus.

An EIR procedure may also be executed by apparatuses responding to the inquiry. An extended inquiry response procedure may include the transmission of an EIR packet that may provide miscellaneous information above what is delivered in the basic inquiry response (e.g., in an FHS packet). An EIR packet may typically comprise information regarding, for example, services offered by the apparatus or some vendor specific information. The impending transmission of an EIR packet may be indicated by an EIR indicator bit that is set in the FHS packet. For example, device discovery may be expedited by user-friendly names not being sent in FHS packets, and thus, in order to show a user-friendly name for a discovered device the name must be provided in an EIR packet (e.g., unless the Bluetooth address is already mapped to the user-friendly name in the device memory). If it is indicated in an FHS packet that an EIR packet follows (e.g., the EIR bit is set), EIR packet transmission may commence in the next slave-to-master slot and may further extend over up to five (5) slots. EIR packets are asynchronous connectionless link (ACL) packets of type DM1, DM3, DM5, DH1, DH3 or DH5.

Certain behaviors may be built into apparatuses in order to facilitate discovery. For example, in order to avoid repeated collisions between devices that simultaneously wake up in the same inquiry hop channel, a device shall back-off for a random period of time. Thus, if an apparatus receives an ID packet and responds by transmitting an FHS packet, it shall generate a random number, RAND, between 0 and MAX_RAND. MAX_RAND may be 1023 for scanning intervals ≥1.28 s. For scanning intervals <1.28 s, MAX_RAND may be as small as 127. Profiles that use a special dedicated inquiry access code (DIAC) may select a MAX_RAND >1023 even when the scanning interval is ≥1.28 s. Discoverable apparatuses may return to a CONNECTION or STANDBY state for the duration of at least RAND timeslots. Before returning to the CONNECTION or STANDBY state, the device may go through the page scan sub-state.

After at least RAND timeslots, a discoverable apparatus shall add an offset of "1" to the phase in the inquiry hop sequence (e.g., the phase has a 1.28 s resolution) and then return to the inquiry scan sub-state again. If a discoverable apparatus is triggered again, it shall repeat the procedure using a new RAND. The offset to the clock accumulates each time an FHS packet is returned. During a probing window, a discoverable apparatus may respond multiple times, but on different frequencies and at different times. Reserved synchronous slots should have priority over response packets, wherein if a response packet overlaps with a reserved synchronous slot, it shall not be sent but waits for the next inquiry message. If a device has EIR data to transmit but the EIR packet overlaps with a reserved synchronous slot, the FHS packet may be sent with the ER bit set to zero in accordance with the Bluetooth specification v4.0, incorporated herein by reference.

In view of the above, inquiry responses can be received by an inquiring apparatus within roughly 80 to 640 ms, depending on the inquiry scan interval of discovered devices. The random back-off for devices using scanning interval <1.28 s is from 0 to 79,375 ms and for other apparatuses (e.g., utilizing the default inquiry interval) is from 0 to 639,375 ms. In view of these operating characteristics, collecting responses from all apparatuses within communication range in an ideal (e.g., error-free) environment, the inquiry sub-state may have to last for 10.24 s unless the inquiring apparatus receives enough responses and aborts the inquiry sub-state earlier. In some instances (e.g., in an error-prone environment), the inquiring apparatus may also extend the inquiry sub-state to increase the probability of receiving all responses. As a consequence of an extended inquiry state and relatively short back-off times, multiple responses may be received from some or all of the responding apparatuses.

As mentioned above, the most recent Bluetooth specification includes features that may be utilized in accordance with at least one embodiment of the present invention. For example, Section 7.1.1 of the Bluetooth Specification v4.0, entitled "Inquiry Command," states that "A device which responds during an inquiry or inquiry period should always be reported to the Host in an Inquiry Result event if the device has not been reported earlier during the current inquiry or inquiry period and the device has not been filtered out using the command Set_Event_Filter. If the device has been reported earlier during the current inquiry or inquiry period, it may or may not be reported depending on the implementation (depending on if earlier results have been saved in the BR/EDR Controller and in that case how many responses that have been saved). It is recommended that the BR/EDR Controller tries to report a particular device only once during an inquiry or inquiry period. When reporting discovered devices to the host, the RSSI parameter measured during the FHS packet by each responding device may be returned." Moreover, section 7.7.38 entitled "Extended Inquiry Result Event" states " . . . If an extended inquiry response packet from the same device is correctly received in a later response, another event shall be generated." Thus the lower-level communication controller may generate events for every an EIR packet it receives, regardless whether the inquiry response has already been reported. It is this constant event generation that may prove beneficial to implementing automated communication configuration and linking in various example implementations.

Figure 5:
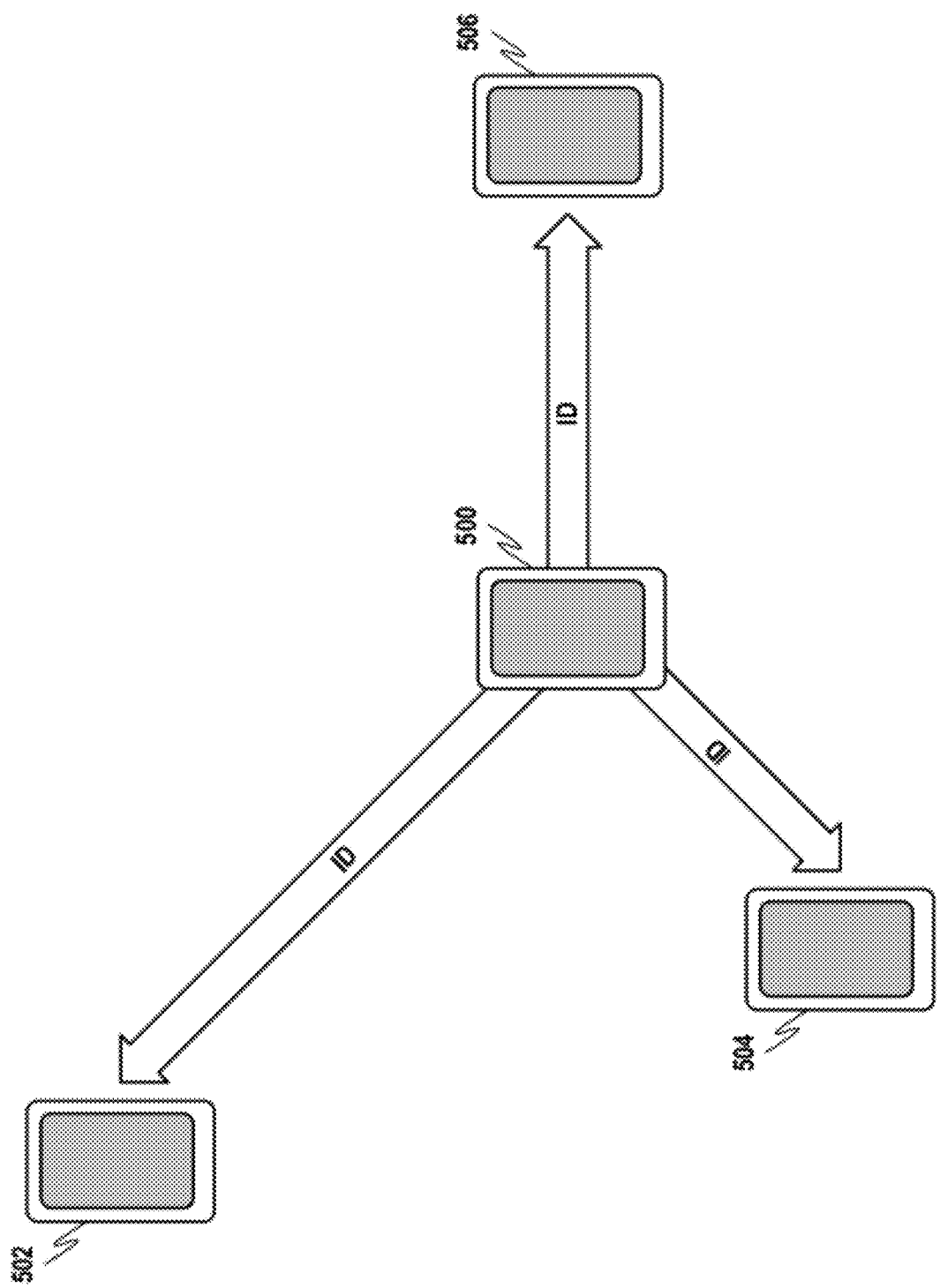
FIG. 5 discloses an example ID packet transmission in accordance with at least one embodiment of the present invention.

For example, four apparatuses 500-506 may be within communication range of each other as disclosed in FIG. 5. Apparatuses 500-506 may all be capable of communicating utilizing the same wireless communication medium (e.g., Bluetooth). In an example usage scenario, the user of apparatus 500 may desire to exchange data (e.g., business cards, pictures, music or multimedia files, etc.) with apparatus 506. Apparatus 500 may then enter an inquiry mode where ID packets are transmitted. The ID packet can be general inquiry access code packets (GIAC) or DIAC packets. Apparatuses 502-506 may then receive these ID packets.

Figure 6:
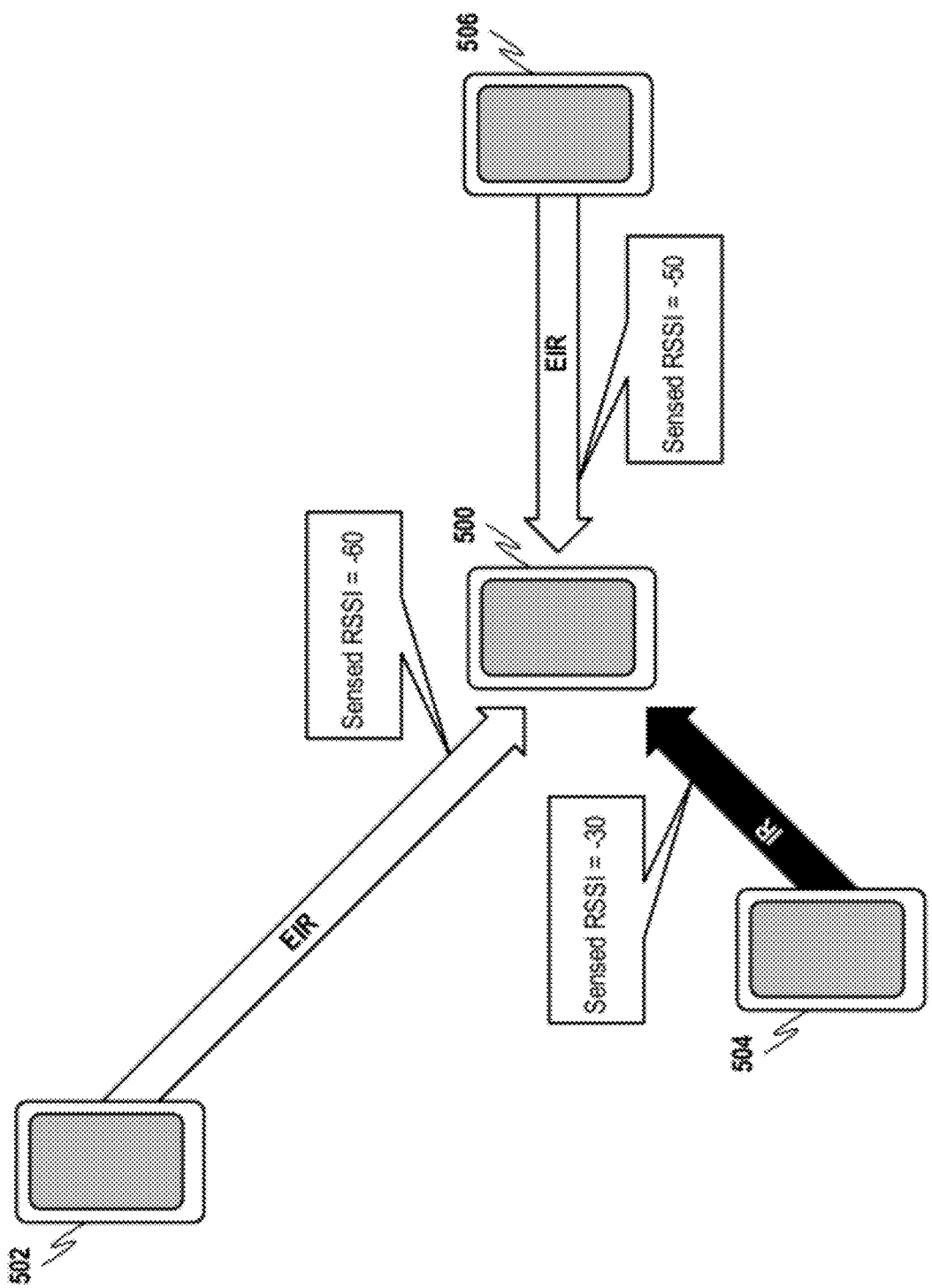
FIG. 6 discloses an example of signal strength measurement in accordance with at least one embodiment of the present invention.

In FIG. 6 apparatuses 502-506 may transmit packets responding to the ID packets received in FIG. 5. In particular, apparatuses 502 and 506 may transmit an ER (e.g., an FHS packet followed by an EIR packet), while apparatus 504 may only transmit an inquiry response (IR) including just an FHS packet. The host in apparatus 500 may receive EIR events triggered by the responses of apparatuses 502 and 506, but not 504. In accordance with at least one embodiment of the present invention, this lack of EIR event reporting for apparatus 504 may be utilized as an initial filter for excluding apparatus 504 as a potential touch apparatus (e.g., apparatuses that do not transmit EIR packets are not touch apparatuses). However, it is important to note that other embodiments of the present invention may be configured for apparatuses that do not have the ability to send EIR packets. A system where a lack of EIR response is utilized as a filter is just one example.

The reported EIR events may include RSSI measurement values as shown, for example, with respect to apparatuses 502 and 506. From the RSSI values the host in apparatus 500 may detect when a device is most likely in "touching range" (e.g., within a distance from the inquiring apparatus that indicates touching-related operations should be executed). For example, there can be a predetermined response criteria including one or more events indicating that an apparatus is within touching range is required to verify that the device is close enough.

Figure 7:
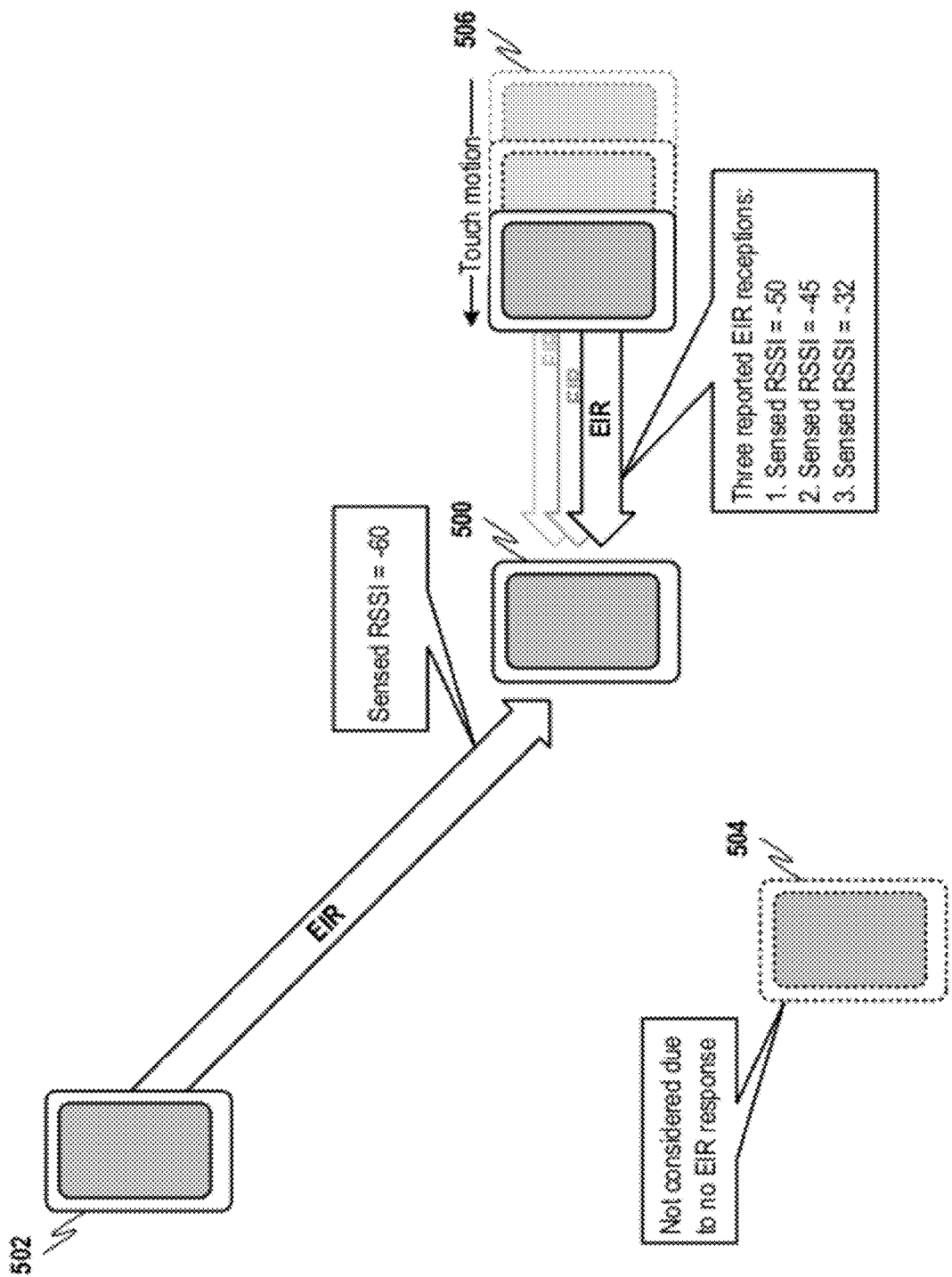
FIG. 7 discloses another example of signal strength measurement in accordance with at least one embodiment of the present invention.

It may also be possible to determine when apparatuses are being moved closer to the other apparatus in order to "touch" apparatuses, or alternatively, when an inquiring apparatus is being moved closer to other apparatuses. An example of the first instance is disclosed in FIG. 7. In the disclosed example a Bluetooth controller in apparatus 500 may receive multiple inquiry responses from apparatuses 502 to 506. The response from apparatus 504 does not provide an EIR, and so Bluetooth controller may only report the first of a multiple of responses to host software stack as HCI Inquiry Event that may contain RSSI of the received response. This may allow apparatus 500 to handle the response in a "standard" manner, wherein the apparatus is displayed in UI 302 in order based on the sensed RSSI. In instances where EIR responses are received (e.g., from apparatuses 502 and 506), the Bluetooth controller may report each received EIR as a HCI EIR Event. This becomes important where apparatus 506 in FIG. 7 is being moved closed to apparatus 500. Because the controller also reports an RSSI for each EIR response, it is easy to track the changing RSSI levels and the movement of apparatus 506. When the measured RSSI satisfies a predetermined response criteria (e.g., the RSSI is measured to be at or above a predetermined level), the corresponding apparatus may be selected for touch-related operations (e.g., expedited connection establishment). In accordance with at least one embodiment of the present invention, apparatus sensor information (e.g., movement or acceleration sensors in the apparatus) may be utilized to determine when, for example, an inquiring apparatus has stopped moving, which may indicate in the apparatus is when touch measurements may be taken (e.g., when the user of the apparatus has stopped moving the apparatus towards another apparatus in order to touch the two apparatuses). Apparatuses having high enough RSSI in this position may be selected for touch-related processing.

In FIG. 7 apparatus 500 is an inquiring device. Apparatuses 502 and 506 respond with EIR and apparatus 504 responds with the normal IR. The BT controller of apparatus 500 reports these responses to its host which also has Touch selection software running. A typical response criteria, as shown in FIG. 7, is when RSSI values is expected to be above certain fixed threshold value, like −30 dBm. Sensing a response packet having −30 dBm will then trigger device selection while −31 dBm will not. It may also be possible that responding apparatuses may send Tx power information in EIR packet, as this is an existing feature in the Bluetooth specification v4.0. In instances where Tx power information is available in the EIR packet, the predetermined response criteria may include an adjustable RSSI threshold value that accounts for the Tx power. For example, the threshold value may be set at 30 dBm below the EIR Tx power, so that if the Tx power level in an FHS packet is +20 dBm then the threshold value that will trigger selection will be the FHS packet being measured at −10 dBm, or 30 dBm below of Tx power level. Secondly, to ensure that apparatuses are maintained in close proximity, the predetermined response criteria may require that more than one EIR must have a sensed RSSI for the corresponding FHS packet at or above a threshold value. In addition different thresholds could be used for different phases, for example, first the threshold value may be set above −45 dBm to select one or more candidate apparatuses and then second, finally deciding the threshold value may be set above −30 dBm.

Another filtering factor for selecting apparatuses for touch operations may be based on services available in a responding apparatus. For example, EIR packets may contain service level information, and so only responses above certain measured signal strength level and from device(s) supporting certain types of BT services (e.g. RSSI above −30 dBm and OBEX file transfer supported) may be selected for touch-related operations. Multiple apparatuses (e.g. two apparatuses next to each other) may be selected, triggering expedited connection establishment between the inquiring device and the two selected apparatuses. It may also be possible to select multiple devices by touching them one after another, wherein all addresses that satisfy the predetermined response criteria (e.g., that have an RSSI above set threshold) may be selected in order. In this way you can easily select a distribution group containing more than one apparatus.

It may also be important for a responding apparatus to make sure that an inquiring apparatus is within touching range, and not some other device that is far away, in order to ensure that communication with the desired apparatus is established. There are several possibilities for checking touch proximity. The connection between the devices may be created after the touch and the responding apparatus checks if the RSSI level meets the criteria of a close proximity device. The responding apparatus could utilize a vendor specific command that provides RSSI information for the particular connection. If the criteria is satisfied, data may be accepted from the inquiring apparatus, and otherwise the connection can be refused. Operating using this type of check may cause some delay in the connection establishment process because the apparatuses have to be in close proximity all the time. It may be also possible for a responding apparatus equipped for touch operations to be configured to measure the RSSI of all received ID packets in certain instances (e.g., when a touch mode is active). Having this information at the outset would speed up the process as the connection does not have to be established before checking the RSSI of ID packets received from a particular inquiring apparatus (e.g., the responding apparatus does not transmit response messages to the particular inquiring apparatus). In accordance with at least one embodiment of the present invention, a touch mode may be initiated by the motion of touching the devices. In particular, the motion may be registered by acceleration sensor, which may activate the touch mode by performing steps such as activating Bluetooth in the apparatus and putting the apparatus in a visible Bluetooth pairing mode for a certain duration (e.g., 10 s). The inquiring apparatus may then transmit ID packets received by the responding apparatus which accepts the connection (e.g., if it is determined to satisfy the predetermined response criteria).

Figure 8:
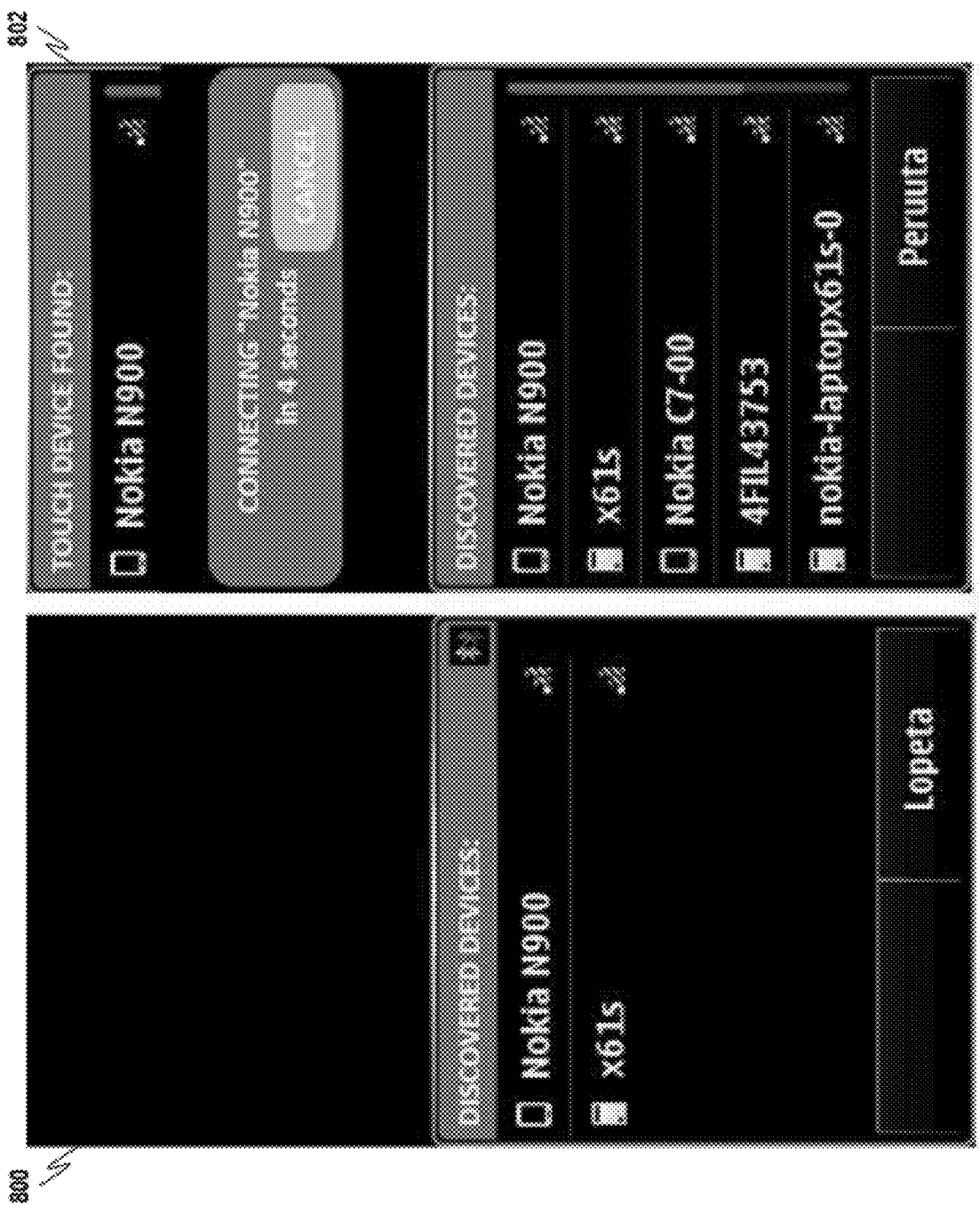
FIG. 8 discloses a modified example user interface display indication in accordance with at least one embodiment of the present invention.

FIG. 8 discloses an example user interface response in accordance with at least one embodiment of the present invention. Similar to FIG. 3, UI 800 displays the beginning of the inquiry process when information is first being received by an inquiring apparatus. Some of the response apparatuses (e.g., "Nokia N900" and "x61s") are already being discovered and displayed for the user at this stage. In UI 802, a touch apparatus has been identified. In accordance with the previously disclosed example implementations, some determination has occurred within the inquiring apparatus that resulted in a finding that the responding apparatus "Nokia N900" meets the predetermined response criteria, which has resulted in the apparatus being selected for touch operations. In this example touch operations includes expedited connection establishment, which is shown in UI 802 where an indication is presented to the user that the apparatus "Nokia N900" will be automatically connected to the inquiring apparatus within 4 seconds. It is important to note that UI 802 and the particular indications presented therein are merely for the sake of explanation in the present disclosure. The various embodiments of the present invention are not limited specifically to the activities disclosed in FIG. 8, and thus, other actions related to wireless connection establishment between two or more apparatuses may also be executed as a result of determining that the responding apparatus satisfies the predetermined response criteria.

Figure 9:
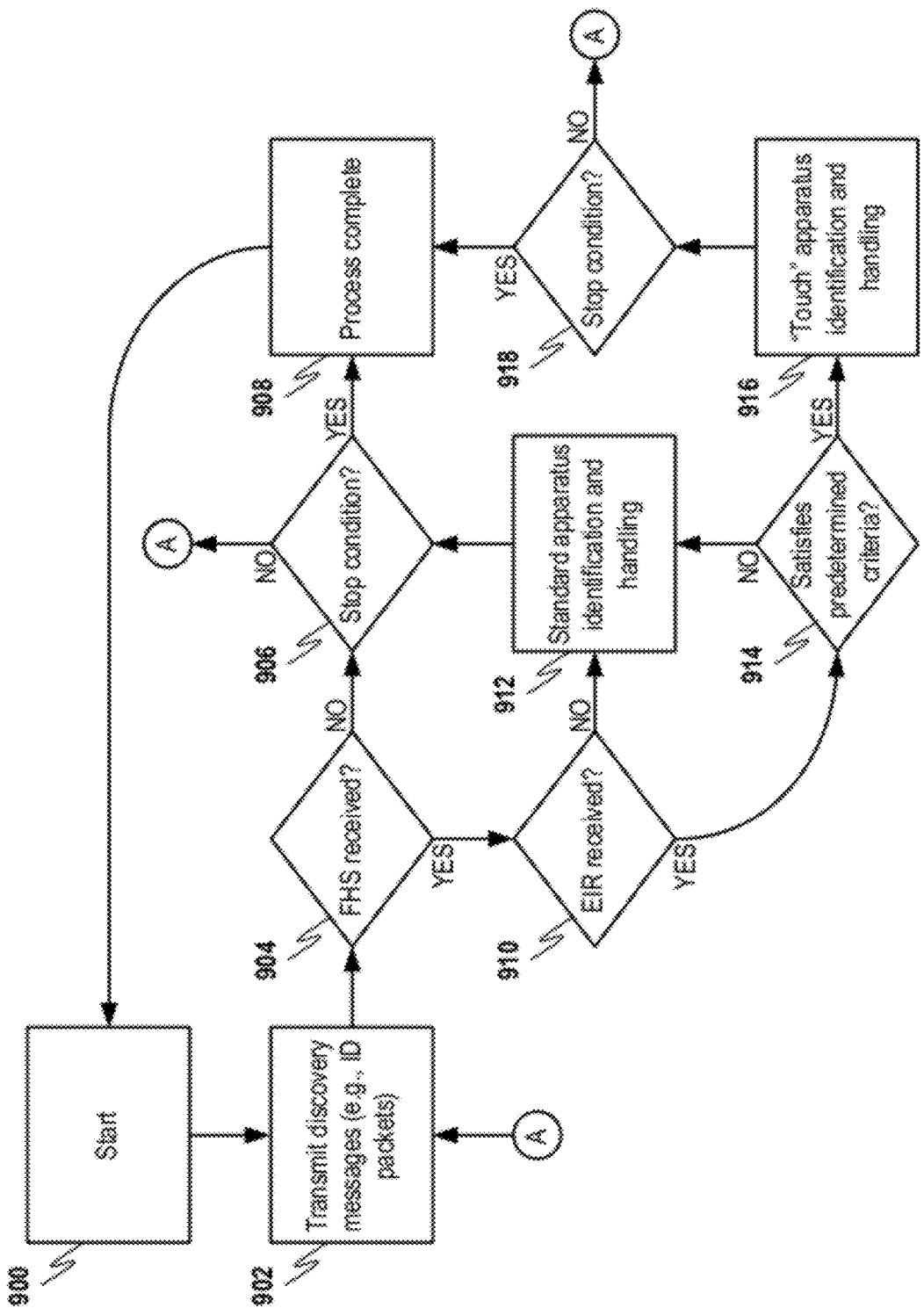
FIG. 9 discloses a flowchart of an example communication process from the transmitting perspective in accordance with at least one embodiment of the present invention.

A flowchart of an example process from the perspective of an inquiring apparatus in accordance with at least one embodiment of the present invention is disclosed in FIG. 9. The process may initiate in step 900, which may be followed by the transmission of packets from an apparatus, wherein the packets are discovery packets (e.g., ID packets in terms of apparatuses operating utilizing Bluetooth communication). The process may then proceed to step 904 wherein a determination may be made as to whether any initial responses are received from other apparatuses (e.g., FHS packets in terms of Bluetooth). If no FHS packets are received in the apparatus, the process may continue to transmit ID packets and check for response in step 902-904 until a stop condition is determined to exist in step 906. Stop conditions may include, for example, a time period for inquiry, a number of ID messages transmitted, an apparatus condition (e.g., power level), etc. If in step 906 a stop condition is determined to exist, then in step 908 the process may be complete and the process may the reinitiate in step 900.

If in step 904 an FHS packet is determined to have been received, the process may proceed to step 910 wherein a further determination may be made as to whether an extended response has been received (e.g., an EIR packet in terms of Bluetooth). If it is determined in step 910 that no EIR packets have been received, the apparatus may executed standard apparatus identification and handling in accordance with the wireless communication medium being employed. In terms of Bluetooth such identification and handling may include identifying the relevant information for the apparatus corresponding to the FHS response in a user interface and possibly listing the apparatus in the user interface in order based on a signal strength (e.g., RSSI) measured for the FHS packet. The process may then return to step 906 to execute transmission and reception steps 902-904 until a stop condition is determined to exist, upon which the process may be complete in step 908.

Alternatively, if it is determined in step 910 that an EIR packet has been received, the process may proceed to step 914 wherein a further determination may be made as to whether the response including the EIR packet satisfies a predetermined response criteria. The predetermined response criteria may comprise, for example, a measured signal strength (e.g., RSSI) at or above a predetermined signal strength level for an FHS packet corresponding to at least one received EIR packet, which may possibly be evaluated along with certain service offerings, etc. If it is determined in step 914 that the response including the EIR packet does not satisfy the predetermined response criteria, the process may return to step 912 for standard apparatus identification and handling. Otherwise, the process may proceed to step 916 wherein "touch" apparatus identification and handling may be executed. For example, apparatuses designated for touch-related operations in step 916 may be indicated to the user in a user interface on the apparatus as touch apparatuses that will be automatically coupled to the apparatus, which may be followed by actual expedited connection establishment between the apparatus and the responding apparatus corresponding to the response including the EIR packet found to satisfy the predetermined response criteria. The processing may then proceed to step 918 wherein a determination may be made as to whether a stop condition similar to step 906 exists in the apparatus. One additional stop condition that may exist in step 908 is that at least one other apparatus has been coupled to the apparatus through a touch operation. If a stop condition is determined to exit in step 918, the process may again be complete in step 908 and may reinitiate in step 900. Otherwise, the process may return to step 902 for additional ID packet transmission.

Figure 10:
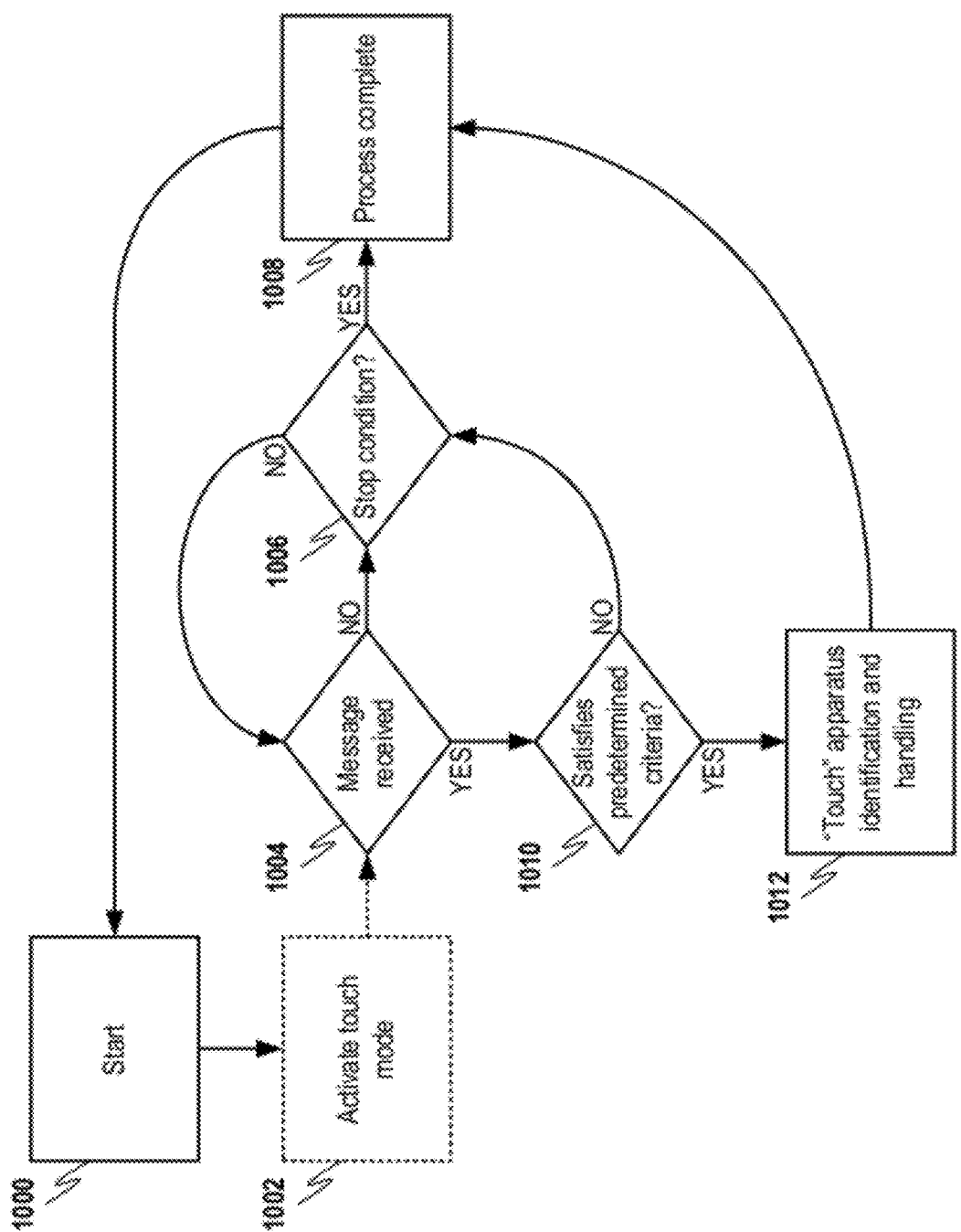
FIG. 10 discloses a flowchart of an example communication process from the receiving perspective in accordance with at least one embodiment of the present invention.

A flowchart of another example process from the perspective of a responding apparatus, in accordance with at least one embodiment of the present invention, is disclosed in FIG. 10. The process may initiate in step 1000, which may be followed by the initiation of a touch mode in the apparatus in optional step 1002. Step 1002 may be optional in that software related to touch operations may always be active in an apparatus (e.g., as a background service). Alternatively, touch mode initiation in step 1002 may occur manually (e.g., as configured in an apparatus user interface by a user) or through activities detected by sensors in the apparatus. For example, a certain motion may be sensed by motion sensors in the apparatus, a certain type of acceleration may be sensed by an acceleration sensor, a certain apparatus orientation may be detected by a gyroscope, etc. Touch mode activation may trigger touch-related software to be initiated, as well as activation of wireless communication medium resources (e.g., activating Bluetooth in an apparatus, as well as making the apparatus visible for connection establishment).

The process may then proceed to step 1004 wherein a determination may be made as to whether any messages (e.g., discovery packets transmitted from another apparatus) have been received in the apparatus. If it is determined in step 1004 that no messages have been received, the process may move to step 1006 wherein a further determination may be made as to whether a stop condition exists. Stop conditions may include, for example, a predetermined duration of time for listening for messages, apparatus condition (e.g., power level), etc. If a stop condition is determined to exist, then in step 1008 the process may be complete and the process may reinitiate in step 1000. Otherwise, the process may return to step 1004 until a determination is made that a message has been received. Upon the determination that a message has been received, the process may move to step 1010 wherein a further determination may be made as to whether the message satisfies a predetermined criteria. The predetermined criteria may comprise, for example, a sensed signal strength (RSSI) for the message received in step 1004 being at or above a predetermined strength level. If in step 1010 the received message does not satisfy the predetermined criteria, then the process may return to steps 1002-1006 in order to await the reception of additional messages.

Alternatively, if in step 1010 a determination is made that the message satisfies the predetermined criteria, the process may proceed to step 1012 wherein "touch" apparatus identification and handling may be performed. Touch apparatus identification and handling may comprise, for example, expedited connection establishment to the inquiring apparatus (e.g., the apparatus that transmitted the message received in step 1004). The process may then terminate in step 1008 and may reinitiate in step 1000.

The various embodiments of the present invention are not limited only to the examples disclosed above, and may encompass other configurations or implementations.

For example, embodiments of the present invention may encompass an apparatus comprising means for transmitting discovery messages, means for receiving one or more messages responding to the invitation messages, means for determining if any of the one or more response messages satisfy a predetermined response criteria, and means for, if it is determined by the apparatus that any of the one or more response messages satisfy the predetermined response criteria, expediting wireless connection establishment between the apparatus and a source apparatus for each of the one or more response messages satisfying the predetermined criteria.

At least one other example embodiment of the present invention may encompass an apparatus comprising means for activating a touch mode, means for receiving a message from at least one other apparatus, means for determining whether the message satisfies a predetermined criteria, and means for, if is determined by the apparatus that the message satisfies the predetermined criteria, expediting wireless connection establishment between the apparatus and the at least one other apparatus.

At least one other example embodiment of the present invention may include electronic signals that cause an apparatus to transmit discovery messages, receive one or more messages responding to the invitation messages, determine if any of the one or more response messages satisfy a predetermined response criteria, and if it is determined by the apparatus that any of the one or more response messages satisfy the predetermined response criteria, expedite wireless connection establishment between the apparatus and a source apparatus for each of the one or more response messages satisfying the predetermined criteria.

At least one other example embodiment of the present invention may include electronic signals that cause an apparatus to activate a touch mode, receive a message from at least one other apparatus, determine by the apparatus whether the message satisfies a predetermined criteria, and if is determined by the apparatus that the message satisfies the predetermined criteria, expedite wireless connection establishment between the apparatus and the at least one other apparatus.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    transmitting discovery messages from an apparatus;
    receiving a plurality of response messages to the discovery messages at the apparatus, each of the plurality of response messages including at least a frequency hopping synchronization packet including an address of a source apparatus for the response message;
    determining by the apparatus if a predetermined response criteria is satisfied, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single source apparatus and the predetermined signal strength level correlates with the apparatus being located close to a touching range from the single source apparatus; and
    when it is determined by the apparatus that the predetermined response criteria is satisfied, displaying on the apparatus an indication that a wireless connection will be automatically established between the apparatus and the single source apparatus satisfying the predetermined response criteria while establishing a connection between the apparatus and said single source apparatus.

2. The method of claim 1, wherein the predetermined response criteria comprises the plurality of response messages including certain types of messages, at least one of the certain types of messages having a measured signal strength at or above a predetermined signal strength level.

3. The method of claim 1, wherein the wireless connection is a Bluetooth connection, the discovery messages are Bluetooth identity (ID) packets and the plurality of response messages comprise at least one of Bluetooth frequency hopping synchronization (FHS) packets and Bluetooth extended inquiry response (EIR) packets.

4. The method of claim 3, wherein the predetermined response criteria comprises the plurality of response messages including both FHS and EIR packets corresponding to a single source apparatus, the FHS packet having a received signal strength indication (RSSI) at or above a predetermined signal strength level.

5. The method of claim 1, wherein the extended inquiry response packet comprises information regarding transmission power of the single source apparatus.

6. The method of claim 5, further comprising adjusting the predetermined signal strength level based on the received transmission power of the single source apparatus.

7. A computer program product comprising computer executable program code recorded on a non-transitory computer readable storage medium, the computer executable program code comprising:
    code configured to cause an apparatus to transmit discovery messages;
    code configured to cause the apparatus to receive a plurality of response messages to the discovery messages, each of the plurality of response messages including at least a frequency hopping synchronization packet including an address of a source apparatus for the response message;
    code configured to cause the apparatus to determine if a predetermined response criteria is satisfied, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single source apparatus and the predetermined signal strength level correlates with the apparatus being located close to a touching range from the single source apparatus; and
    code configured to cause the apparatus to, when it is determined by the apparatus that the predetermined response criteria is satisfied, display on the apparatus an indication that a wireless connection will be automatically established between the apparatus and the single source apparatus satisfying the predetermined response criteria while establishing a connection between the apparatus and said single source apparatus.

8. The computer program product of claim 7, wherein the predetermined response criteria comprises the plurality of response messages including certain types of messages, at least one of the certain types of messages having a measured signal strength at or above a predetermined signal strength level.

9. The computer program product of claim 7, wherein the wireless connection is a Bluetooth connection, the discovery messages are Bluetooth identity (ID) packets and the plurality of response messages comprise at least one of Bluetooth frequency hopping synchronization (FHS) packets and Bluetooth extended inquiry response (EIR) packets.

10. The computer program product of claim 9, wherein the predetermined response criteria comprises the plurality of response messages including both FHS and EIR packets corresponding to a single source apparatus, the FHS packet having a received signal strength indication (RSSI) at or above a predetermined signal strength level.

11. The computer program product of claim 7, wherein the predetermined response criteria comprises a measured signal strength level at or above a first predetermined signal strength level for a first received response message from a single source apparatus and a measured signal strength level at or above a second predetermined signal strength level for subsequently received response messages from the same single source apparatus, the first predetermined signal strength level and the second predetermined signal strength level being different.

12. The computer program product of claim 11, wherein the first predetermined signal strength level is smaller than the second predetermined signal strength level.

13. The computer program product of claim 7, wherein the extended inquiry response packet comprises information regarding transmission power of the single source apparatus.

14. The computer program product of claim 13, further comprising code configured to adjust the predetermined threshold level value based on the received transmission power of the single source apparatus.

15. An apparatus, comprising:
    at least one processor; and
    at least one memory including executable instructions, the at least one memory and the executable instructions being configured to, in cooperation with the at least one processor, cause the apparatus to perform at least the following:
    transmit discovery messages;
    receive a plurality of response messages to the discovery messages, each of the plurality of response messages including at least a frequency hopping synchronization packet including an address of a source apparatus for the response message;

determine if a predetermined response criteria is satisfied, the predetermined response criteria comprising receiving a plurality of response messages each of which includes a frequency hopping synchronization packet and an extended inquiry response packet, having a measured signal strength at or above a predetermined signal strength level, wherein the plurality of response messages are received from a single source apparatus and the predetermined signal strength level correlates with the apparatus being located close to a touching range from the single source apparatus; and when it is determined by the apparatus that the predetermined response criteria is satisfied, display on the apparatus an indication that a wireless connection will be automatically established between the apparatus and the single source apparatus satisfying the predetermined response criteria while establishing a connection between the apparatus and said single source apparatus.

16. The apparatus of claim 15, wherein the predetermined response criteria comprises the plurality of response messages including certain types of messages, at least one of the certain types of messages having a measured signal strength at or above a predetermined signal strength level.

17. The apparatus of claim 15, wherein the wireless connection is a Bluetooth connection, the discovery messages are Bluetooth identity (ID) packets and the plurality of response messages comprise at least one of Bluetooth frequency hopping synchronization (FHS) packets and Bluetooth extended inquiry response (EIR) packets.

18. The apparatus of claim 17, wherein the predetermined response criteria comprises the plurality of response messages including both FHS and EIR packets corresponding to the single source apparatus, the FHS packet having a received signal strength indication (RSSI) at or above a predetermined signal strength level.

19. The apparatus of claim 15, wherein the predetermined response criteria comprises a measured signal strength level at or above a first predetermined signal strength level for a first received response message from a single source apparatus and a measured signal strength level at or above a second predetermined signal strength level for subsequently received response messages from the same single source apparatus, the first predetermined signal strength level and the second predetermined signal strength level being different.

20. The apparatus of claim 19, wherein the first predetermined signal strength level is smaller than the second predetermined signal strength level.

21. The apparatus of claim 15, wherein the extended inquiry response packet comprises information regarding transmission power of the single source apparatus.

22. The apparatus of claim 15, wherein the at least one memory and the executable instructions are configured to, in cooperation with the at least one processor, cause the apparatus to adjust the predetermined signal strength level based on the received transmission power of the single source apparatus.

23. A system, comprising:
an apparatus; and
one or more other apparatuses;
the apparatus transmitting discovery messages and receiving a plurality of response messages to the discovery messages from the one or more other apparatuses, each of the plurality of response messages including at least a frequency hopping synchronization packet including an address of a source apparatus for the response message;
the apparatus further determining if a predetermined response criteria is satisfied, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single source apparatus and the predetermined signal strength level correlates with the apparatus being located close to a touching range from the single source apparatus, and when it is determined that the predetermined response criteria is satisfied, displaying on the apparatus an indication that a wireless connection will be automatically established between the apparatus and the single source apparatus satisfying the predetermined response criteria while establishing a connection between the apparatus and said single source apparatus.

24. The method of claim 1, wherein the predetermined response criteria comprises a measured signal strength level at or above a first predetermined signal strength level for a first received response message from a single source apparatus and a measured signal strength level at or above a second predetermined signal strength level for subsequently received response messages from the same single source apparatus, the first predetermined signal strength level and the second predetermined signal strength level being different.

25. The method of claim 24, wherein the first predetermined signal strength level is smaller than the second predetermined signal strength level.

* * * * *